United States Patent
Bovington et al.

(10) Patent No.: US 12,255,690 B2
(45) Date of Patent: Mar. 18, 2025

(54) OPTICAL DATA CONVERTER

(71) Applicant: Cisco Technology, Inc., San Jose, CA (US)

(72) Inventors: Jock T. Bovington, Koenigstein im Taunus (DE); Matthew J. Traverso, Saratoga, CA (US)

(73) Assignee: Cisco Technology, Inc., San Jose, CA (US)

( * ) Notice: Subject to any disclaimer, the term of this patent is extended or adjusted under 35 U.S.C. 154(b) by 199 days.

(21) Appl. No.: 18/177,992

(22) Filed: Mar. 3, 2023

(65) Prior Publication Data
US 2024/0297717 A1 Sep. 5, 2024

(51) Int. Cl.
*H04B 10/00* (2013.01)
*H04B 10/50* (2013.01)
*H04J 14/00* (2006.01)

(52) U.S. Cl.
CPC ................... *H04B 10/501* (2013.01)

(58) Field of Classification Search
CPC ...... H04B 10/40; H04B 10/43; H04B 10/501; H04B 10/503; H04B 10/505
See application file for complete search history.

(56) References Cited

U.S. PATENT DOCUMENTS

| | | | |
|---|---|---|---|
| 9,116,313 B2 | 8/2015 | Traverso et al. | |
| 11,249,266 B2 | 2/2022 | Mazzini et al. | |
| 11,817,904 B2* | 11/2023 | Nielsen | G02B 6/28 |
| 2007/0242954 A1 | 10/2007 | Sackman | |
| 2009/0110391 A1 | 4/2009 | Matityahu et al. | |
| 2011/0150475 A1 | 6/2011 | Soto et al. | |
| 2019/0103916 A1 | 4/2019 | Coffey et al. | |
| 2020/0386960 A1 | 12/2020 | Akl-Chedid et al. | |
| 2022/0236477 A1 | 7/2022 | Bovington et al. | |
| 2024/0340085 A1* | 10/2024 | Nagashima | G02F 1/225 |

OTHER PUBLICATIONS

The Oldcommguy, "What is a Network Tap and Why do we care?," NetworkDataPedia, Dated: Apr. 20, 2020, pp. 1-7.
"Configuring Tap Aggregation and MPLS Stripping," Cisco.com, Dated: Oct. 4, 2022, pp. 1-14.

* cited by examiner

*Primary Examiner* — Daniel G Dobson
(74) *Attorney, Agent, or Firm* — Patterson + Sheridan, LLP (57) ABSTRACT

A pluggable device and method are presented. The pluggable device includes a substrate, a first pin positioned on the substrate, an optical source positioned on the substrate, and an integrated circuit positioned on the substrate. The optical source produces a source optical signal and transmits the source optical signal through the first pin. The integrated circuit transmits a received optical data signal and transmits a data signal based on a portion of the optical data signal.

20 Claims, 6 Drawing Sheets

OPTICAL DATA CONVERTER

TECHNICAL FIELD

Embodiments presented in this disclosure generally relate to optical communications. More specifically, embodiments disclosed herein relate to a pluggable device that coverts optical data.

BACKGROUND

Optical signals (e.g., lasers or lights) may be used to communicate data or other information to optical devices. An optical source (e.g., a laser diode) may be used to source these optical signals.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

According to an embodiment, a pluggable device includes a substrate, a first pin positioned on the substrate, an optical source positioned on the substrate, and an integrated circuit positioned on the substrate. The optical source produces a source optical signal and transmits the source optical signal through the first pin. The integrated circuit transmits a received optical data signal and transmits a data signal based on a portion of the optical data signal.

According to another embodiment, a method includes producing, by an optical source positioned on a substrate of a pluggable device, a source optical signal and transmitting the source optical signal through a first pin positioned on the substrate. The method also includes transmitting, by an integrated circuit positioned on the substrate, a received optical data signal and transmitting, by the integrated circuit, a data signal based on a portion of the optical data signal.

According to another embodiment, a pluggable device includes a substrate, an optical source positioned on the substrate, and an integrated circuit positioned on the substrate. The optical source produces a source optical signal and transmits the source optical signal. The integrated circuit transmits a received optical data signal and generates a data signal based on a portion of the optical data signal.

EXAMPLE EMBODIMENTS

An optical source (e.g., a laser diode) may be used to source optical signals for optical devices. The optical source, however, also generates or may be sensitive to heat energy, which may be undesirable in certain circuits or designs.

The present describes a pluggable device that includes an optical source that produces a source optical signal for other optical devices. The pluggable device may communicate the source optical signal to another optical device, and the optical device may use the source optical signal to produce an optical data signal (e.g., an optical signal with modulated data). The pluggable device may also include an integrated circuit that receives an optical data signal (e.g., from the optical device). The integrated circuit may produce a data signal based on a portion or all of the optical data signal. The data signal may be an electric signal that represents the data in the optical data signal. The integrated circuit may then store or log the data in the data signal, or the integrated circuit may transmit the data signal to another device. In this manner, the pluggable device provides a source optical signal for other optical devices and converts portions of received optical data signals.

Figure 1:
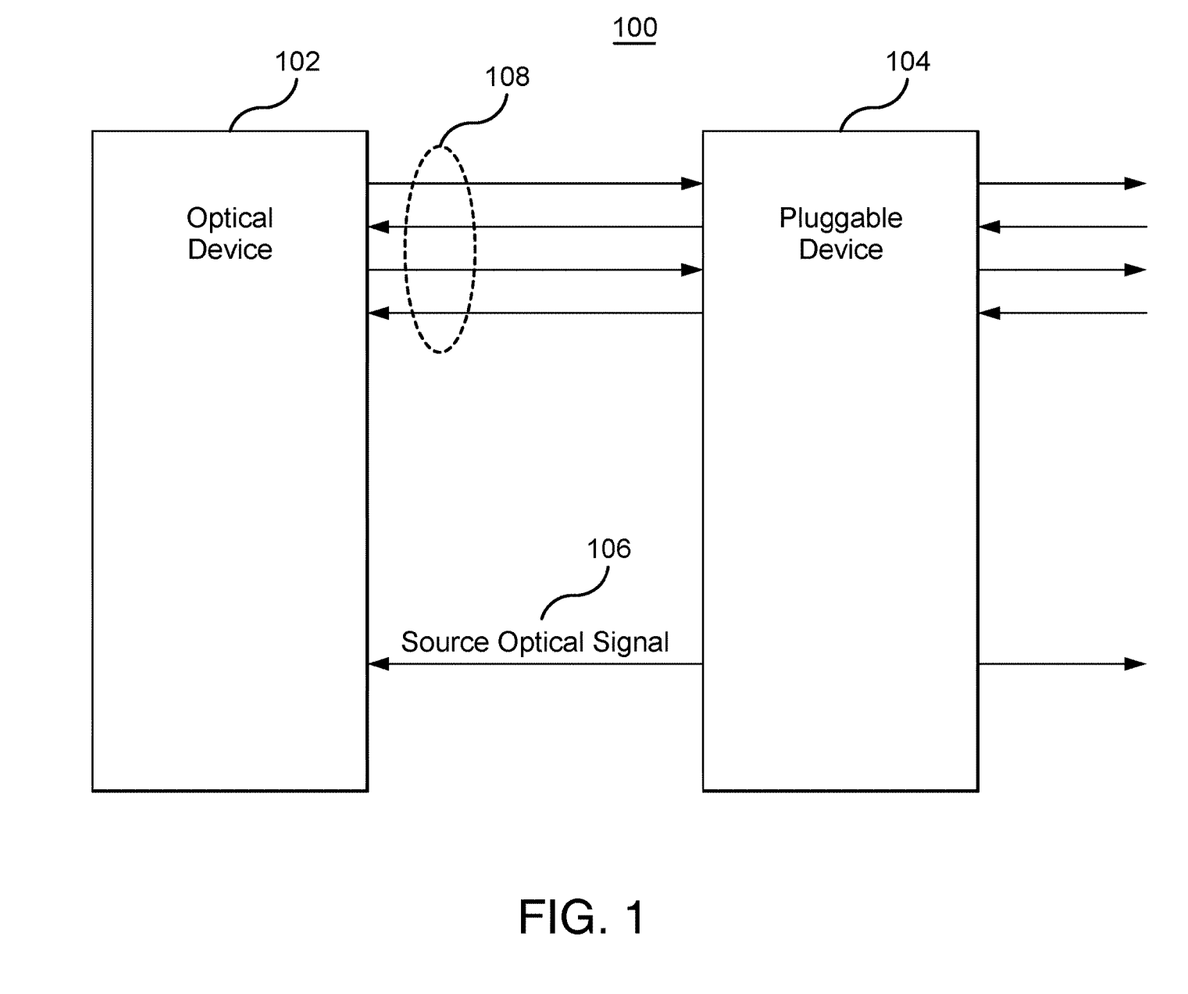
FIG. 1 illustrates an example system.

FIG. 1 illustrates an example system 100. As seen in FIG. 1, the system 100 includes an optical device 102 and a pluggable device 104. Generally, the pluggable device 104 may provide a source optical signal for the optical device 102. The optical device 102 may produce optical data signals using the source optical signal. Additionally, the pluggable device 104 may store or convert some of the optical signals from the optical device 102.

The optical device 102 may be any suitable device that handles optical signals. For example, the optical device 102 may be an optical engine that receives both optical signals and electric signals. The optical device 102 may convert the optical signals into electric signals and the electric signals into optical signals. The optical device 102 may then transmit the optical signals or the electric signals to suitable receivers. For example, the optical device 102 may communicate optical signals to the pluggable device 104. Additionally, the optical device 102 may communicate electric signals to an integrated circuit (not shown).

The pluggable device 104 may be a module that physically connects or plugs into a chassis or a cage to optically align with the optical device 102. The pluggable device 104 may include an optical source that produces a source optical signal 106. The pluggable device 104 may communicate the source optical signal 106 to the optical device 102. The optical device 102 may generate or produce optical signals using the source optical signal 106. For example, the optical device 102 may include a modulator that modulates the source optical signal 106 to produce optical signals.

The optical connection between the optical device 102 and the pluggable device 104 may form a datapath 108. The datapath 108 may include any suitable number of optical paths. In the example of FIG. 1, the datapath 108 includes four optical paths. Two of the optical paths are used by the optical device 102 to communicate optical signals to the pluggable device 104. Two of the data paths are used by the pluggable device 104 to communicate optical signals to the optical device 102. The pluggable device 104 may include an integrated circuit that stores or logs information optical signals received at the pluggable device 104. For example, the integrated circuit may convert the received optical signals into electric signals, and/or the integrated circuit may store or log the information represented by the electric signals. In some instances, the integrated circuit may communicate the electric signal to another device (e.g., another integrated circuit). In this manner, the pluggable device 104 may convert some or all of a received optical signal into an electric signal and may transmit or store data from the optical signal.

Figure 2:
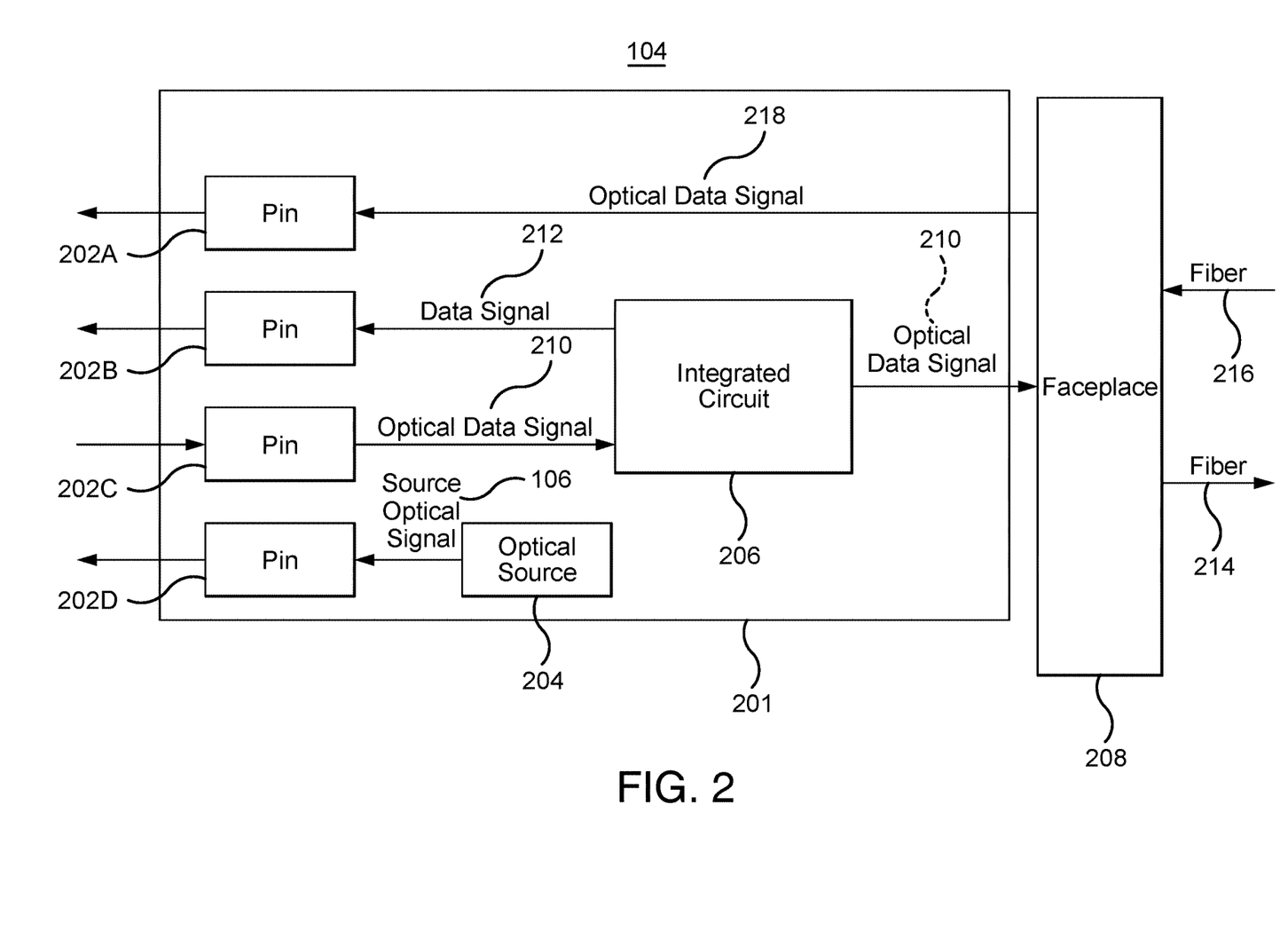
FIG. 2 illustrates an example pluggable device in the system of FIG. 1.

FIG. 2 illustrates an example pluggable device 104 in the system 100 of FIG. 1. As seen in FIG. 2, the pluggable device 104 includes a substrate 201, one or more pins 202, an optical source 204, an integrated circuit 206, and a faceplate 208. These components of the pluggable device 104 may be included in one form factor or housing. Generally, the optical source 204 produces the source optical signal 106 that is provided to the optical device 102. The integrated circuit 206 may store, log, or transmit information from received optical data signals.

The substrate 201 forms a foundation for the other components of the pluggable device 104. For example, the other components of the pluggable device 104 may be positioned on the substrate 201. In the example of FIG. 2, the pins 202, the optical source 204, and the integrated circuit 206 may be positioned on the substrate 201. In some embodiments, the substrate 201 is a printed circuit board, and the components of the pluggable device 104 are soldered or positioned onto the printed circuit board. The faceplate 208 may couple with the substrate 201. For example, the faceplate 208 and/or the substrate 201 may include notches, protrusions, tabs, screws, etc. that couple the faceplate 208 to the substrate 201.

The pluggable device 104 may include any suitable number of pins 202. The pins 202 may include interfaces that allow the pluggable device 104 to form optical or electrical connections through the pins 202. In the example of FIG. 2, the pluggable device 104 includes the pins 202A, 202B, 202C, and 202D. The pins 202A, 202C, and 202D may be used to form optical connections (e.g., with the optical device 102 shown in FIG. 1). The pin 202B may be used to form an electrical connection (e.g., with another integrated circuit).

The optical source 204 may produce the source optical signal 106. The optical source 204 may be any suitable device that produces optical signals. For example, the optical source 204 may be a laser diode that produces the source optical signal 106. The optical source 204 directs the source optical signal 106 to the pin 202D. The source optical signal 106 is directed through the pin 202D and out of the pluggable device 104. As seen in FIG. 1, the pluggable device 104 provides the source optical signal 106 to the optical device 102. The optical device 102 may then use the source optical signal 106 to generate or produce other optical signals.

The integrated circuit 206 may analyze, store, or transmit information from received optical signals. In the example of FIG. 2, the integrated circuit 206 receives an optical data signal 210 received at the pin 202C. The optical data signal 210 may be generated or produced by the optical device 102 using the source optical signal 106 provided by the optical source 204. The optical data signal 210 may be a modulated optical signal that includes or represents data or information. The optical device 102 may communicate the optical data signal 210 to the pin 202C of the pluggable device 104. The optical data signal 210 may then be directed to the integrated circuit 206.

The integrated circuit 206 may produce a data signal 212 by converting a portion of the optical data signal 210 into an electric signal. For example, the integrated circuit 206 may use a photodetector to convert some or all of the optical data signal 210 into an electric signal that represents the information or data in the optical data signal 210. The integrated circuit 206 may log or store the information or data in the optical data signal 210. In some embodiments, the integrated circuit 206 transmits the data signal 212 to another device. In the example of FIG. 2, the integrated circuit 206 transmits the data signal 212 to the pin 202B. The pluggable device 104 may then communicate the data signal 212 to another device (e.g., another integrated circuit) through the pin 202B. In addition to generating the data signal 212, the integrated circuit 206 may transmit or communicate the optical data signal 210 to another device. In the example of FIG. 2, the integrated circuit 206 transmits the optical data signal to the faceplate 208.

In some embodiments, the integrated circuit 206 transmits the portion of the optical data signal 210 to the faceplate 208. An additional fiber may be connected to the faceplate 208. The additional fiber may carry the portion of the optical data signal 210 away from the pluggable device 104.

The faceplate 208 may provide a physical interface to which one or more optical fibers may connect. In the example of FIG. 2, the optical fibers 214 and 216 physically connect to the faceplate 208. The fibers 214 and 216 may carry optical signals to and from the pluggable device 104 at the faceplate 208. For example, the fiber 214 may carry the optical data signal 210 transmitted by the integrated circuit 206 to the faceplate 208. The fiber 214 may carry the optical data signal 210 to another optical device. The fiber 216 may carry an optical data signal 218 to the pluggable device 104. The faceplate 208 may communicate the optical data signal 218 to the pin 202A. The pluggable device 104 may then communicate the optical data signal 218 at the pin 202A to another device (e.g., the optical device 102 shown in FIG. 1). As a result, the pluggable device 104 may transmit optical data signals to the optical device 102 and receive optical data signals from the optical device 102.

In this manner, the pluggable device 104 may provide the source optical signal 106 to other optical devices. Additionally, the pluggable device 104 may store, log, or transmit information contained in received optical data signals. In the example of FIG. 2, the pluggable device 104 may store, log, or transmit information from the optical data signal 210 received from the optical device 102. The integrated circuit 206 may generate the data signal 212 by converting some or all of the optical data signal 210 into an electric signal. For example, the integrated circuit 206 may use a photodetector to convert some or all of the optical data signal 210 into an electric signal. The integrated circuit 206 may then transmit the data signal 212 to another device.

Figure 3:
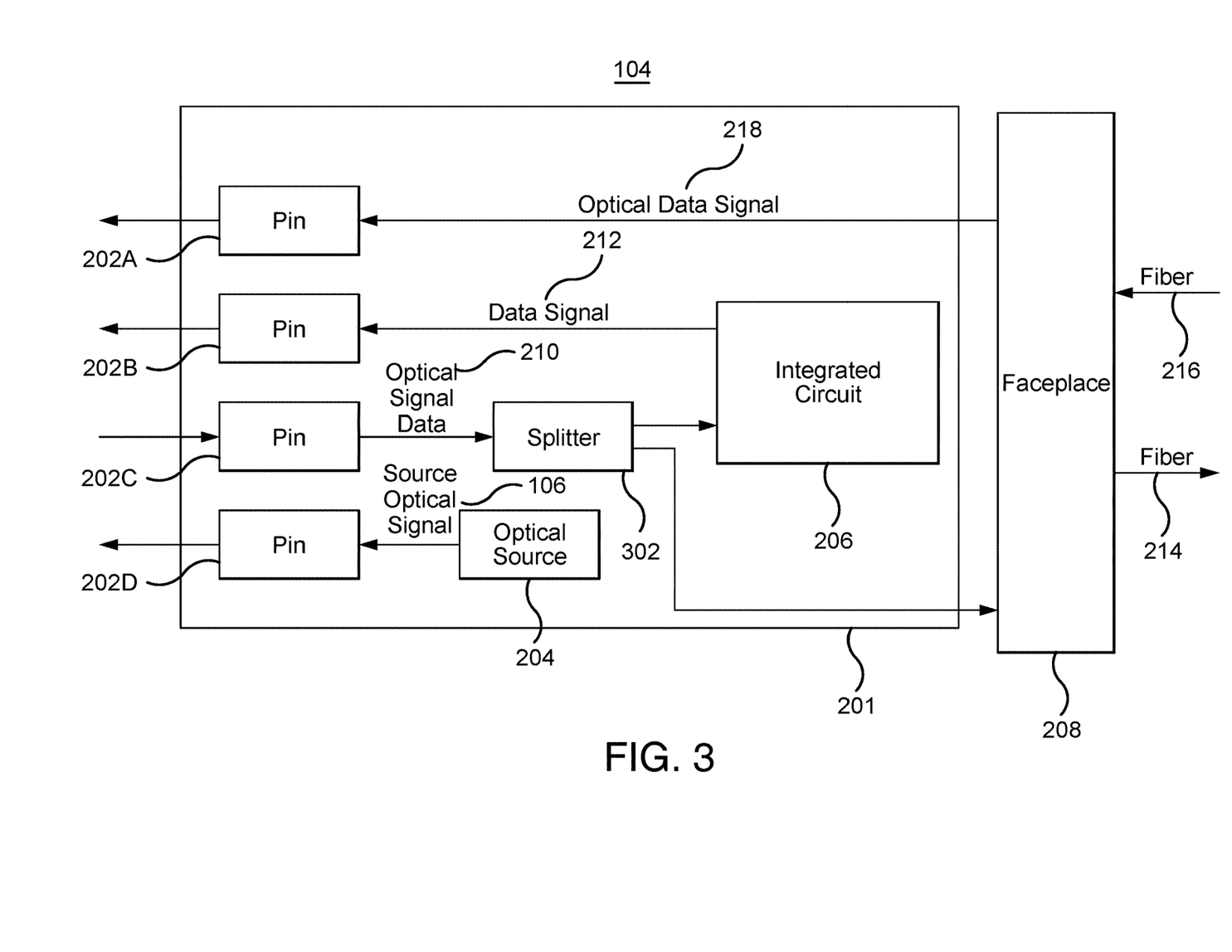
FIG. 3 illustrates an example pluggable device in the system of FIG. 1.

FIG. 3 illustrates an example pluggable device 104 in the system 100 of FIG. 1. Several components of the pluggable device 104 in the example of FIG. 3 perform the same or similar functions as the components in the pluggable device 104 shown in FIG. 2. For example, the pluggable device 104 in the example of FIG. 3 includes the substrate 201 that forms a foundation for other components of the pluggable device 104. The pluggable device 104 also includes the pins 202A, 202B, 202C and 202D. The pins 202A, 202C and 202D are used to form optical connections (e.g., with the optical device 102 shown in FIG. 1), while the pin 202B is used to form an electric connection. The optical source 204 produces the source optical signal 106 that is communicated to the optical device 102. The pin 202C receives the optical data signal 210 from the optical device 102. The optical device 102 may have generated or produced the optical data signal 210 using the source optical signal 106. The faceplate 208 receives the optical fibers 214 and 216. Additionally, the fiber 216 carries the optical data signal 218 to the faceplate 208. The faceplate 208 then directs the optical data signal 218 to the pin 202A. The pluggable device 104 may transmit the optical data signal 218 to the optical device 102.

As seen in FIG. 3, the pluggable device 104 includes a splitter 302. The splitter 302 may be an optical splitter that amplifies and directs an optical signal to multiple destinations. For example, the splitter 302 may receive the optical data signal 210 from the pin 202C. The splitter 302 may amplify the optical data signal 210, and then direct the optical data signal 210 to the integrated circuit 206 and the faceplate 208. The faceplate 208 may transmit the optical data signal 210 away from the pluggable device 104 over the fiber 214.

The integrated circuit 206 receives the optical data signal 210 from the splitter 302. The integrated circuit 206 may store or log the information or data in the optical data signal 210. The integrated circuit 206 may produce the data signal 212 by converting some or all of the optical data signal 210 into an electric signal. For example, the integrated circuit 206 may use a photodetector to convert some or all of the optical data signal 210 into an electric signal. The integrated circuit 206 may transmit the data signal 212 to the pin 202B. The pluggable device 104 may then transmit the data signal 212 to another device (e.g., another integrated circuit). In this manner, the pluggable device 104 may communicate information or data in the optical data signal 210 to another device.

In some embodiments, the integrated circuit 206 transmits the portion of the optical data signal 210 to the faceplate 208. An additional fiber may be connected to the faceplate 208. The additional fiber may carry the portion of the optical data signal 210 away from the pluggable device 104.

Figure 4:
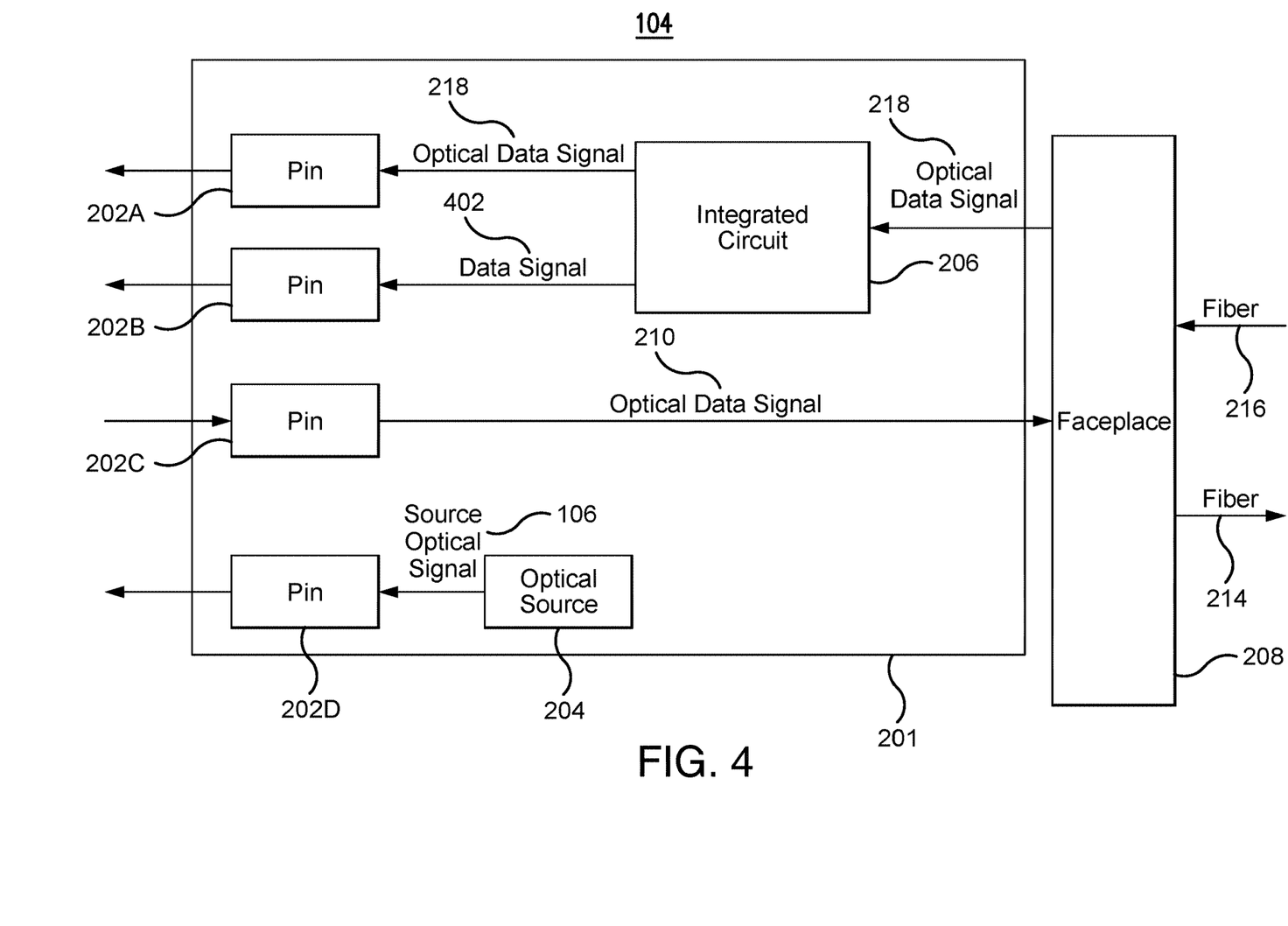
FIG. 4 illustrates an example pluggable device in the system of FIG. 1.

FIG. 4 illustrates an example pluggable device 104 in the system 100 of FIG. 1. As seen in FIG. 4, the pluggable device 104 includes the substrate 201, one or more pins 202, the optical source 204, the integrated circuit 206, and the faceplate 208. In particular embodiments, the pluggable device 104 provides the source optical signal 106 for the optical device 102. Additionally, the pluggable device 104 stores, logs, or transmits information in a received optical data signal.

The substrate 201 forms a foundation for the other components of the pluggable device 104. For example, the other components of the pluggable device 104 may be positioned on the substrate 201. In the example of FIG. 4, the pins 202, the optical source 204, and the integrated circuit 206 may be positioned on the substrate 201. In some embodiments, the substrate 201 is a printed circuit board, and the components of the pluggable device 104 are soldered or positioned onto the printed circuit board. The faceplate 208 may couple with the substrate 201. For example, the faceplate 208 and/or the substrate 201 may include notches, protrusions, tabs, screws, etc. that couple the faceplate 208 to the substrate 201.

The pluggable device 104 may include any suitable number of pins 202. The pins 202 may provide interfaces through which the pluggable device 104 may form optical or electrical connections. In the example of FIG. 4, the pluggable device 104 includes the pins 202A, 202B, 202C, and 202D. The pins 202A, 202C, and 202D are used to form optical connections. The pin 202B is used to form an electrical connection.

Similar to previous examples, the optical source 204 produces the source optical signal 106. For example, the optical source 204 may be a laser diode that produces the source optical signal 106. The optical source 204 directs the source optical signal 106 to the pin 202D. The pluggable device 104 then directs the source optical signal 106 towards the optical device 102. The optical device 102 may use the source optical signal 106 to generate or produce optical signals (e.g., the optical data signal 210). For example, the optical device 102 may include a modulator that modulates the source optical signal 106 with information or data to produce the optical data signal 210.

The optical device 102 may communicate the optical data signal 210 to the pluggable device 104. The optical data signal 210 may be received at the pin 202C. The pluggable device 104 may then direct the optical data signal 210 from the pin 202C to the faceplate 208.

The faceplate 208 may provide a physical interface that receives the optical fibers 214 and 216. The optical fibers 214 and 216 may carry optical signals to the faceplate 208 or away from the faceplate 208. In the example of FIG. 4, the optical fiber 214 may carry the optical data signal 210 away from the pluggable device 104. Additionally, the fiber 216 may carry the optical data signal 218 to the pluggable device 104.

The faceplate 208 may direct the optical data signal 218 to the integrated circuit 206. The optical data signal 218 may include information or data. The integrated circuit 206 may store or log the information or data in the optical data signal 218. In some embodiments, the integrated circuit 206 produces the data signal 402 by converting some or all of the optical data signal 218 into an electric signal. For example, the integrated circuit 206 may use a photodetector to convert some or all of the optical data signal 218 into an electric signal. The data signal 402 may include some of the information or data in the optical data signal 218. The integrated circuit 206 may communicate the data signal 402 to the pin 202B. The pluggable device 104 may then transmit the data signal 402 to another device (e.g., another integrated circuit). In this manner, the pluggable device 104 stores, logs, or transmits some or all of the information in the optical data signal 218. Additionally, the integrated circuit 206 may transmit the optical data signal 218 to the pin 202A. The pluggable device 104 may then transmit the optical data signal 218 to the optical device 102.

In some embodiments, the integrated circuit 206 transmits the portion of the optical data signal 218 to the faceplate 208. An additional fiber may be connected to the faceplate 208. The additional fiber may carry the portion of the optical data signal 210 away from the pluggable device 104.

Figure 5:
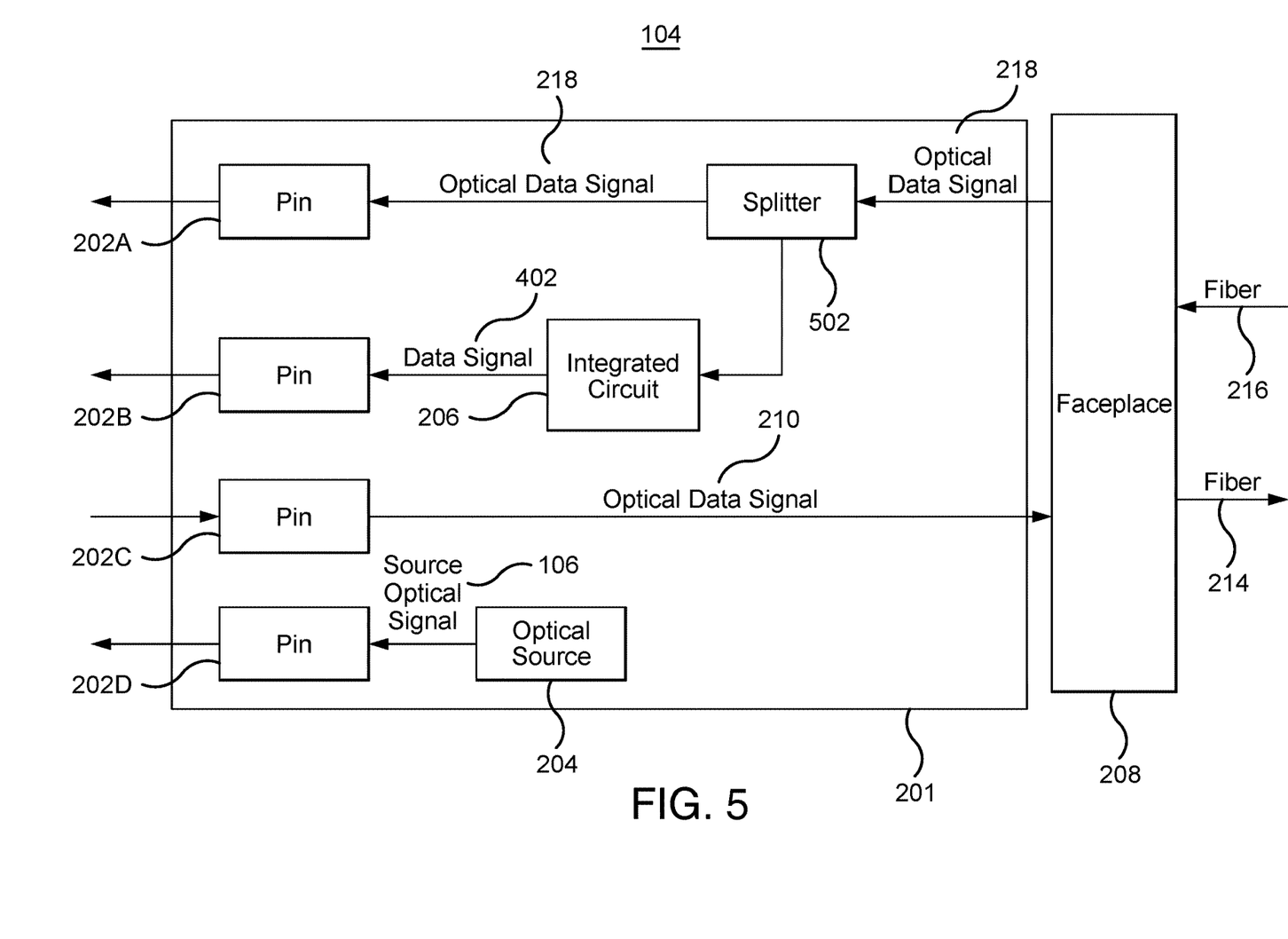
FIG. 5 illustrates an example pluggable device in the system of FIG. 1.

FIG. 5 illustrates an example pluggable device 104 in the system 100 of FIG. 1. Generally, several of the components of the pluggable device 104 may perform the same or similar functions as the components of the pluggable device 104 shown in FIG. 4. For example, the substrate 201 may form a foundation for other components of the pluggable device 104, and the pins 202A, 202B, 202C and 202D may provide interfaces through which the pluggable device 104 may form optical or electrical connections. The pins 202A, 202C, and 202D may be used to form optical connections, while the pin 202B may be used to form an electric connection. The optical source 204 may produce the source optical signal 106 that is provided to the optical device 102. The optical device 102 may use the source optical signal 106 to generate or produce other optical signals, such as the optical data signal 210. The faceplate 208 may provide a physical interface to receive the optical fibers 214 and 216. The optical fibers 214 and 216 may carry optical signals to the pluggable device 104 or away from the pluggable device

104. For example, the fiber 214 may be used to transmit the optical data signal 210 received from the optical device 102.

As seen in FIG. 5, the pluggable device 104 includes a splitter 502 that amplifies and directs an optical signal to multiple components. The splitter 502 may receive the optical data signal 218 from the faceplate 208. The fiber 216 may have carried the optical data signal 218 to the faceplate 208. The splitter 502 may amplify the optical data signal 218. The splitter 502 then directs the optical data signal 218 to the pin 202A and the integrated circuit 206. The pluggable device 104 transmits the optical data signal 218 at the pin 202A to the optical device 102.

The integrated circuit 206 receives the optical data signal 218 from the splitter 502. The optical data signal 218 may include information or data. The integrated circuit 206 may store or log some or all of the information in the optical data signal 218. In some embodiments the integrated circuit 206 produces the data signal 402 by converting some or all of the optical data signal 218 into an electric signal. For example, the integrated circuit 206 may use a photodetector to convert some or all of the optical data signal 218 into an electric signal. The data signal 402 may include some or all of the information or data in the optical data signal 218. The integrated circuit 206 then transmits the data signal 402 to the pin 202B. The pluggable device 104 transmits the data signal 402 to another device (e.g., another integrated circuit). In this manner, the pluggable device 104 stores, logs, or transmits information or data in the optical data signal 218.

In some embodiments, the integrated circuit 206 transmits the portion of the optical data signal 218 to the faceplate 208. An additional fiber may be connected to the faceplate 208. The additional fiber may carry the portion of the optical data signal 210 away from the pluggable device 104.

Figure 6:
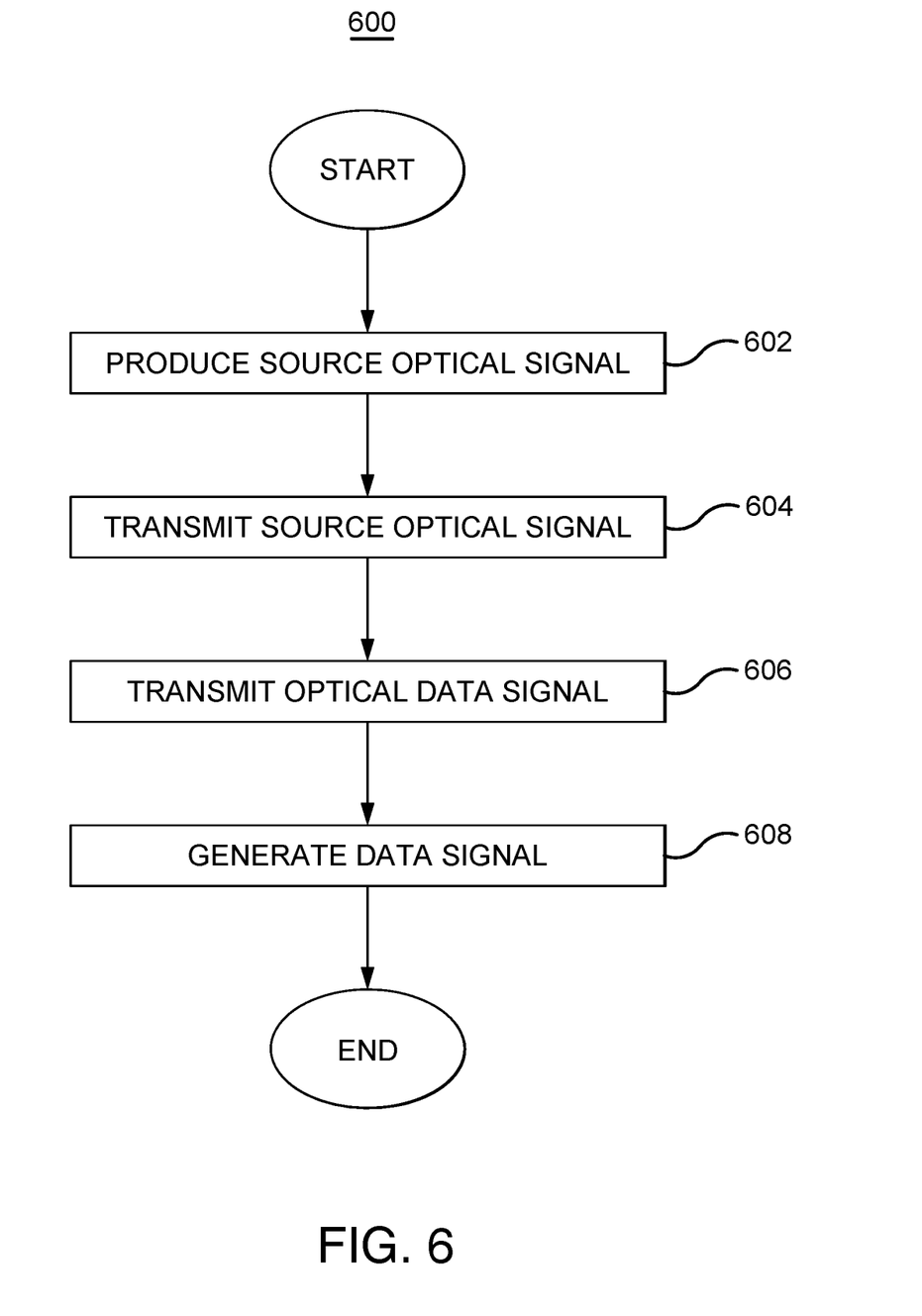
FIG. 6 is a flowchart of an example method performed in the system of FIG. 1.

FIG. 6 is a flowchart of an example method 600 performed in the system 100 of FIG. 1. In particular embodiments, the pluggable device 104 may perform the method 600. By performing the method 600, the pluggable device 104 provides the source optical signal 106 for the optical device 102. Additionally, the pluggable device 104 stores, logs, or transmits information or data in a received optical signal.

In block 602, the pluggable device 104 produces the source optical signal 106. For example, the pluggable device 104 may include an optical source 204 (e.g., a laser diode) that produces the source optical signal 106. In block 604, the pluggable device 104 transmits the source optical signal 106. For example, the optical source 204 may transmit the source optical signal 106 to the pin 202D of the pluggable device 104. The pluggable device 104 may then transmit the source optical signal 106 away from the pluggable device 104 into the optical device 102. The optical device 102 may use the source optical signal 106 to generate or produce the optical data signal 210. The optical device 102 may communicate the optical data signal 210 back to the pluggable device 104.

In block 606, the pluggable device 104 transmits an optical data signal. In some embodiments, the pluggable device 104 may receive the optical data signal 210 from the optical device 102. The pluggable device 104 then communicates the optical data signal 210 to the integrated circuit 206. The pluggable device 104 may communicate the optical data signal 210 directly to the integrated circuit 206, or the pluggable device 104 may communicate the optical data signal 210 to the splitter 302 that communicates the optical data signal 210 to the integrated circuit 206. The integrated circuit 206 or the splitter 302 may then communicate the optical data signal 210 to the faceplate 208. The faceplate 208 may then direct the optical data signal 210 to the fiber 214, which transmits the optical data signal 210 away from the pluggable device 104.

In certain embodiments, the pluggable device 104 receives the optical data signal 210 at the pin 202C. The pin 202C then directs the optical data signal 210 to the faceplate 208. The faceplate 208 then directs the optical data signal 210 to the fiber 214, which transmits the optical data signal 210 away from the pluggable device 104.

In block 608, the integrated circuit 206 generates the data signal 212 or the data signal 402. In some embodiments, the integrated circuit 206 receives the optical data signal 210 from the pin 202C or from the splitter 302. The integrated circuit 206 may store or log some or all of the information or data in the optical data signal 210. The integrated circuit 206 may produce the data signal 212 by converting some or all of the optical data signal 210 into an electric signal. For example, the integrated circuit 206 may include a photodetector that converts some or all of the optical data signal 210 into an electric signal. The integrated circuit 206 then transmits the data signal 212 to the pin 202B. The pluggable device 104 then transmits the data signal 212 to another device (e.g., another integrated circuit).

In some embodiments, the integrated circuit 206 receives the optical data signal 218 from the faceplate 208 or the splitter 502. The fiber 216 may have carried the optical data signal 218 to the faceplate 208. The integrated circuit 206 may store or log some or all of the information or data in the optical data signal 218. The integrated circuit 206 may produce the data signal 402 by converting some or all of the optical data signal 218 into an electric signal. For example, the integrated circuit 206 may include a photodetector that converts some or all of the optical data signal 218 into an electric signal. The integrated circuit 206 then transmits the data signal 402 to the pin 202B. The pluggable device 104 then transmits the data signal 402 to another device (e.g., another integrated circuit).

In summary, a pluggable device 104 includes an optical source 204 that produces a source optical signal 106 for other optical devices. The pluggable device 104 may communicate the source optical signal 106 to another optical device 102, and the optical device 102 may use the source optical signal 106 to produce an optical data signal 210 (e.g., an optical signal with modulated data). The pluggable device 104 may also include an integrated circuit 206 that receives an optical data signal (e.g., the optical data signal 210 from the optical device 102 or the optical data signal 218 from the faceplate 208). The integrated circuit 206 may produce a data signal 212 or 402 based on a portion or all of the optical data signal. The data signal 212 or 402 may be an electric signal that represents the data in the optical data signal. The integrated circuit 206 may then store or log the data in the data signal 212 or 402, or the integrated circuit 206 may transmit the data signal 212 or 402 to another device. In this manner, the pluggable device 104 provides a source optical signal 106 for other optical devices and converts portions of received optical data signals.

As a result, the pluggable device 104 provides source optical signals 106 for other optical devices. Additionally, the pluggable device 104 stores, logs, or transmits information or data from portions of received optical data signals. In some instances, the pluggable device 104 may convert the optical data signals into electric signals and transmit the electric signals.

In the current disclosure, reference is made to various embodiments. However, the scope of the present disclosure is not limited to specific described embodiments. Instead, any combination of the described features and elements, whether related to different embodiments or not, is contemplated to implement and practice contemplated embodiments. Additionally, when elements of the embodiments are described in the form of "at least one of A and B," or "at least one of A or B," it will be understood that embodiments including element A exclusively, including element B exclusively, and including element A and B are each contemplated. Furthermore, although some embodiments disclosed herein may achieve advantages over other possible solutions or over the prior art, whether or not a particular advantage is achieved by a given embodiment is not limiting of the scope of the present disclosure. Thus, the aspects, features, embodiments and advantages disclosed herein are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

In view of the foregoing, the scope of the present disclosure is determined by the claims that follow.

We claim:

1. A pluggable device, comprising:
a substrate;
a first pin positioned on the substrate;
an optical source positioned on the substrate, the optical source arranged to produce a source optical signal and to transmit the source optical signal through the first pin; and
an integrated circuit positioned on the substrate, the integrated circuit arranged to:
transmit a received optical data signal; and
transmit a data signal based on a portion of the optical data signal.

2. The pluggable device of claim 1, further comprising a second pin, wherein the optical data signal is received through the second pin, and wherein the optical data signal is generated using the source optical signal.

3. The pluggable device of claim 1, further comprising a faceplate arranged to receive a first optical fiber, wherein the optical data signal is received over the first optical fiber.

4. The pluggable device of claim 3, wherein the faceplate is further arranged to receive a second optical fiber, and wherein the integrated circuit transmits the data signal through the second optical fiber.

5. The pluggable device of claim 1, further comprising a second pin, wherein the integrated circuit is further arranged to:
convert the portion of the optical data signal into an electric signal, wherein the data signal is the electric signal; and
transmit the data signal through the second pin.

6. The pluggable device of claim 1, further comprising a splitter arranged to direct the optical data signal to the integrated circuit.

7. The pluggable device of claim 6, wherein the splitter is further arranged amplify the optical data signal.

8. A method comprising:
producing, by an optical source positioned on a substrate of a pluggable device, a source optical signal;
transmitting the source optical signal through a first pin positioned on the substrate;
transmitting, by an integrated circuit positioned on the substrate, a received optical data signal; and
transmitting, by the integrated circuit, a data signal based on a portion of the optical data signal.

9. The method of claim 8, wherein the optical data signal is received through a second pin of the pluggable device, and wherein the optical data signal is generated using the source optical signal.

10. The method of claim 8, wherein the optical data signal is received over a first optical fiber received by a faceplate of the pluggable device.

11. The method of claim 10, wherein the data signal is transmitted through a second optical fiber received by the faceplate.

12. The method of claim 8, further comprising:
converting, by the integrated circuit, the portion of the optical data signal into an electric signal, wherein the data signal is the electric signal; and
transmitting the data signal through a second pin of the pluggable device.

13. The method of claim 8, further comprising directing, by a splitter of the pluggable device, the optical data signal to the integrated circuit.

14. The method of claim 13, further comprising amplifying, by the splitter, the optical data signal.

15. A pluggable device comprising:
a substrate;
an optical source positioned on the substrate, the optical source arranged to produce a source optical signal and to transmit the source optical signal; and
an integrated circuit positioned on the substrate, the integrated circuit arranged to:
transmit a received optical data signal; and
generate a data signal based on a portion of the optical data signal.

16. The pluggable device of claim 15, wherein the optical data signal is generated using the source optical signal.

17. The pluggable device of claim 15, further comprising a faceplate arranged to receive a first optical fiber, wherein the optical data signal is received over the first optical fiber.

18. The pluggable device of claim 15, wherein the integrated circuit is further arranged to convert the portion of the optical data signal into an electric signal, wherein the data signal is the electric signal.

19. The pluggable device of claim 15, further comprising a splitter arranged to direct the optical data signal to the integrated circuit.

20. The pluggable device of claim 19, wherein the splitter is further arranged amplify the optical data signal.

* * * * *